US000001115H

United States Statutory Invention Registration [19]

[11] Reg. Number: H1115

[43] Published: Dec. 1, 1992

Nachbar

[54] ROBOT ARM APPARATUS

[75] Inventor: Henry D. Nachbar, Ballston Lake, N.Y.

[73] Assignee: The United States of America as represented by the United States Department of Energy, Washington, D.C.

[21] Appl. No.: 546,827

[22] Filed: Jul. 2, 1990

[51] Int. Cl.[5] ..... F28F 17/00

[52] U.S. Cl. ..... 165/11.1; 376/245; 376/248; 376/249; 376/316; 165/11.2; 122/379; 122/390; 122/392; 414/8; 414/749; 901/23; 901/24; 901/25; 901/44

[58] Field of Search ..... 376/260, 316, 248, 249, 376/245; 122/379, 382, 390, 392, 504; 165/11.1, 11.2, 908; 901/23, 24, 25, 44; 414/8, 749, 751

[56] References Cited

U.S. PATENT DOCUMENTS

| | | | |
|---|---|---|---|
| 3,664,310 | 5/1972 | Locke, Sr. et al. | 122/379 |
| 3,766,005 | 10/1973 | Erkens | 176/19 |
| 4,056,972 | 11/1977 | Bromwich | 73/620 |
| 4,231,419 | 11/1980 | Gugel | 165/11 A |
| 4,253,914 | 3/1981 | Fogelberg | 176/87 |
| 4,424,769 | 1/1984 | Charamathieu et al. | 122/392 |
| 4,487,165 | 12/1984 | Weber et al. | 122/392 |
| 4,521,844 | 6/1985 | Sturges, Jr. et al. | 364/167 |
| 4,638,667 | 1/1987 | Zimmer et al. | 73/432.1 |
| 4,676,201 | 6/1987 | Lahoda et al. | 122/392 |
| 4,741,878 | 5/1988 | Gebelin et al. | 376/248 |
| 4,760,876 | 8/1988 | Minogue | 165/11.2 |
| 4,770,053 | 9/1988 | Broderick et al. | 73/866.5 |
| 4,980,120 | 12/1990 | Bowman et al. | 376/316 |

*Primary Examiner*—Brooks H. Hunt
*Assistant Examiner*—Chrisman D. Carroll
*Attorney, Agent, or Firm*—Judy K. Kosovich; William R. Moser; Richard E. Constant

[57] ABSTRACT

A robot arm apparatus is provided for inspecting and/or maintaining an interior of a steam generator which has an outside wall and a port for accessing the interior of the steam generator. The robot arm apparatus includes a flexible movable conduit for conveying inspection and/or maintenance apparatus from outside the steam generator to the interior of the steam generator. The flexible conduit has a terminal working end which is translated into and around the interior of the steam generator. Three motors located outside the steam generator are employed for moving the terminal working end inside the steam generator in "x", "y", and "z" directions, respectively. Commonly conducted inspection and maintenance operations include visual inspection for damaged areas, water jet lancing for cleaning sludge deposits, core boring for obtaining sludge deposits, and scrubbing of internal parts.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

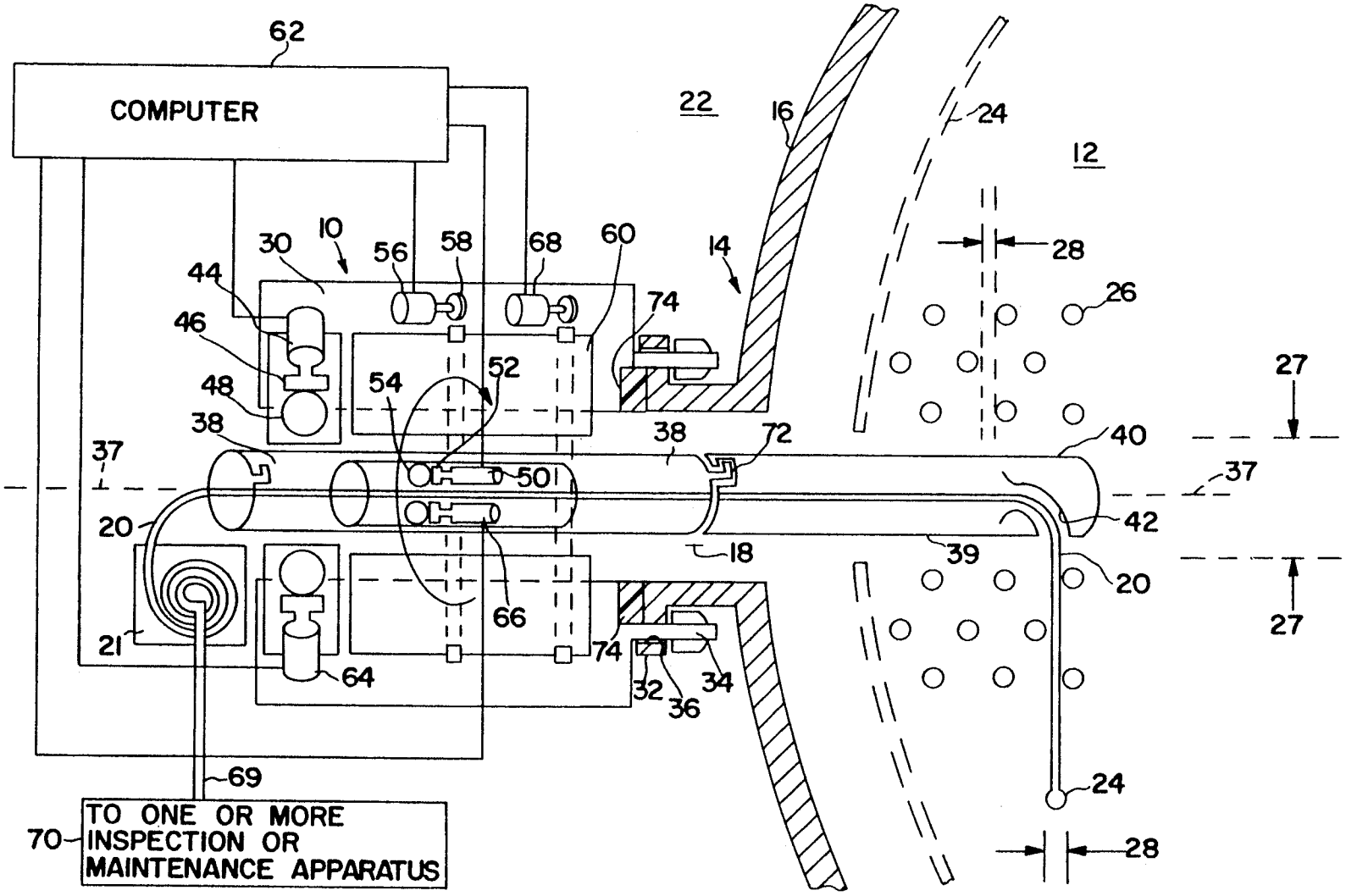
COMPUTER
TO ONE OR MORE INSPECTION OR MAINTENANCE APPARATUS

ROBOT ARM APPARATUS

The U.S. Government has rights in this invention pursuant to Contract No. DE-AC12-76SN00052 between the United States Department of Energy and General Electric Company.

BACKGROUND OF THE INVENTION

The present invention relates to the field of inspecting and maintaining of steam generators used in nuclear-powered power plants, and more particularly to power plants employing relatively small steam generators.

In the present state of the art of inspection and maintenance of relatively large steam generators used in nuclear-powered power plants, a robot-based system is employed. A commonly known robot called CECIL was designed and fabricated by Foster-Miller, Inc. of Waltham, Mass. for this purpose. The CECIL robot is a self-contained unit for operation in a commercial nuclear steam generator. Commercial steam generators are relatively large, and the entire CECIL robot is able to enter the commercial steam generator for inspection and maintenance thereof. Commonly conducted inspection and maintenance operations include visual inspection for damaged areas, water jet lancing for cleaning sludge deposits, core boring for obtaining sludge deposits, and scrubbing of internal parts. Future maintenance operations may include sludge deposit removal by application of laser energy and sludge deposit removal by electrolytic enhancement.

However, commercial steam generators are relatively large compared to steam generators used in nuclear-powered naval power plants. With naval nuclear steam generators, the steam generators themselves are too small for entry of a CECIL robot. More specifically, naval nuclear steam generators generally have 4 or 5 inch secondary side handholes and a nominal $2\frac{1}{2}$ inch wide divider lane between arrays of steam generator tubes in the steam generator. These dimensions of a naval nuclear steam generator are entirely too small for employing the CECIL robot or other known robots that enter the nuclear steam generator for inspection and maintenance operations. It would be desirable, therefore, to provide a robot-based system that would be useful for inspection and maintenance of the relatively small nuclear steam generators found in naval nuclear steam generators.

Even with a commercial steam generator, problems are associated with the use of a robot that is self-contained and operates completely inside the steam generator. For example, in use, the robot rests on the lower blowdown pipe which is located just above the tubesheet. Consequently, there is a drop of approximately 9 inches, and the robot rests below the line of sight through the hand hole. Since the robot rests on the blowdown pipe, it is in an area of sludge deposit buildup and an area of steam generator tubes that have a coating of sludge deposits. In this respect, it is known that blowdown pipes are often in poor condition with regard to their structural soundness, so that there is a substantial risk of blowdown pipe failure when the weight of the self-contained robot rests on the blowdown pipe. It would be desirable, therefore, to provide a robot-based system for inspection and maintenance of nuclear steam generators that does not subject blowdown pipes to risk of failure due to carrying the weight of the robot system.

Another problem associated with the robot system that completely enters the nuclear steam generator is the problem of decontamination when inspection or maintenance operation is completed. In such a case, the entire relatively large and complex self-contained robot must be decontaminated after use. It would be desirable, however, if only a limited portion of a robot-based inspection and maintenance system for nuclear steam generators need to be decontaminated after their use.

Still another problem associated with the use of a robot system that completely enters a nuclear steam generator is the contact that takes place between the conventional robot and steam generator tubes inside the steam generator. More specifically, the conventional robot depends upon touching and pushing contact with steam generator tubes for indexing the robot from tube to tube. Furthermore, rigid positioning of the conventional robot inside the nuclear steam generator depends entirely upon how tight or hard a push the robot's positioning feet exert on the steam generator tubes. The problems are accentuated when vibrations due to high pressure water lancing are transmitted back through the lance to the internal robot body and positioning feet which are in contact with the steam generator tubes.

In addition, steam generator tubes in naval nuclear steam generators are smaller in diameter and have thinner walls than steam generator tubes of commercial nuclear steam generators. With thinner wall tubes, denting and distortion become a problem.

Thus, it would be desirable to provide a robot-based inspection and maintenance system for nuclear steam generators that does not place unwanted stresses and strains on the steam generator tubes inside the steam generator.

In some naval nuclear plants the handhole is offset with respect to the divider lane in the steam generator. Because of the offset, the port of the handhole and the divider lane are not in alignment. This lack of alignment creates difficulties for a relatively large robot which, for this reason, cannot be successfully used for inspection and/or maintenance operations. It would be desirable, therefore, to provide means for inspection and/or maintenance of the interior of a steam generator that can be successfully employed in a steam generator whose handhole is offset from the divider lane.

SUMMARY OF THE INVENTION

Accordingly, it is a primary object of the present invention to provide a robot-based system that would be useful for inspection and maintenance of the relatively small nuclear steam generators found in naval nuclear steam generators.

Another object of the invention is to provide a robot-based system for inspection and maintenance of nuclear steam generators that does not subject blowdown pipes to risk of failure due to carrying the weight of the robot system.

Another object is to provide a robot-based inspection and maintenance system for nuclear steam generators in which only limited portions of the system need to be decontaminated after the inspection and maintenance operations are completed.

Still another object of the invention is to provide a robotbased inspection and maintenance system for nuclear steam generators that does not place unwanted stresses and strains on the steam generator tubes inside the steam generator.

Yet another object of the invention is to provide means for inspection and/or maintenance of the interior of a steam generator that can be successfully employed in a steam generator whose handhole is offset from the divider lane.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel robot arm apparatus is provided for inspecting and/or maintaining an interior of a steam generator which has an outside wall and a port for accessing the interior of the steam generator. The novel apparatus includes a flexible movable conduit for conveying the inspection and/or maintenance apparatus from outside the steam generator to the interior of the steam generator. The flexible conduit has a terminal working end which is translated into and around the interior of the steam generator.

The novel robot arm apparatus of the invention also includes means, connected to the outside wall of the steam generator and retained substantially outside the interior of the steam generator, for translating and guiding the terminal working end of the flexible conduit in the interior of the steam generator.

The means for translating and guiding the terminal working end of the flexible conduit provide for translating the terminal working end in the interior of the steam generator in three directions corresponding to three degrees of freedom. By means located outside the steam generator, the terminal working end is moved inside the steam generator in the following directions: in a direction perpendicular to the outside wall of the steam generator in a direction that is collinear with an axis extending through the access port, which may be likened to movement in an "x" direction; in a direction perpendicular to the "x" direction which may be likened to a "y" direction; and in a direction that sweeps circularly around the axis extending through the access port which may be likened to a "z" direction.

A rigid hollow conduit is provided and permits the flexible conduit to move therethrough from outside to inside the steam generator. The rigid hollow conduit is translatable in the "x" direction. The rigid hollow conduit has a terminal end and, at the terminal end, means are provided for shifting the direction of translation of the flexible conduit by 90 degrees from the "x" direction to the "y" direction.

Means, located outside the steam generator, are also provided for rotating the rigid hollow conduit and the terminal working end of the flexible conduit around the axis extending through the access port. This rotational translation provides a path of circular movement for the terminal working end of the flexible conduit inside the steam generator. In this way, the terminal working end of the flexible conduit is translated in the "z" direction inside the steam generator.

Preferably, a computer is used to control motors for moving the subject apparatus in the "x", "y", and "z" directions. Each of the motors is connected to the computer by a suitable conductor through which control signals flow from the computer to the respective motors. Encoders are employed to measure the distances travelled in the respective "x", "y", and "z" directions, and the encoders are also connected to the computer. Each of the encoders is connected to the computer by a suitable conductor through which distance information flows from the respective encoders to the computer. Under computer control, the robot arm of the invention can be incremented or indexed stepwise in each of the "x", "y", and "z" directions.

In accordance with another aspect of the invention, a method is provided for inspecting and/or maintaining an interior of a steam generator having an outside wall and a port for accessing the interior. The method includes the steps of: obtaining a flexible conduit containing inspection and/or maintenance apparatus and having a terminal working end; from outside the steam generator, positioning the terminal working end of the flexible conduit inside the steam generator; performing an inspection and/or maintenance operation; and, from outside the steam generator, indexing the terminal working end of the flexible conduit in three dimensions inside the steam generator.

The robot-arm-based inspection and maintenance system of the invention can be used for the following inspection and maintenance operations, among others: visual inspection of steam generator tubes, blowdown tubes, accumulation of sludge piles, wrapper annulus, and the support plate; dimensional measurement and contour mapping of sludge piles; and removal of sludge deposits by water jet lancing, laser application, electrolytic enhancement, and mechanical polishing; and sludge pile sampling by core boring.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawing, incorporated in and forming a part of the specification, illustrates several aspects of the present invention and, together with the description, serves to explain the principles of the invention. In the drawing, FIG. 1 is a schematic diagram of a cross-section of one embodiment of the robot arm apparatus of the invention.

DETAILED DESCRIPTION

With reference to FIG. 1, an embodiment of a robot arm apparatus 10 of the invention is shown. The apparatus 10 is used for inspecting and/or maintaining an interior 12 of a steam generator 14 having an outside wall 16 and a port 18 for accessing the interior 12 of the steam generator 14. The steam generator 14 is used in a nuclear power plant. The port 18 shown in FIG. 1 is a handhole on the secondary side of the steam generator 14. The steam generator 14 also includes a wrapper plate 24 and an array of steam generator tubes 26. The array of steam generator tubes 26 is arranged in two substantially symmetrical parts sub-arrays divided by a space designated as gap 27 which is also called a divider lane. Furthermore, the steam generator tubes 26 are arranged in a orderly pattern with gaps between rows and columns of the tubes 26. The gaps between the tubes 26 form tube lanes 28.

The apparatus 10 includes a flexible movable conduit 20, stored in coiled form in magazine 21, for conveying inspection and/or maintenance apparatus, described further below, from outside (region 22) the steam generator 14 to the interior 12 of the steam generator 14. The flexible conduit 20 includes a terminal working end 24.

A housing 30 having threaded holes (not shown) is connected to a flange 32 forming the port 18 of the handhole by threaded bolts 34 that pass through holes 36 in the flange 32. In this way, the housing 30 is supported by the outside wall 16 by and is retained substantially outside the interior 12 of the steam generator 14. The housing 30 houses most of the structures in the robot arm apparatus of the invention which provide for translating and guiding the terminal working end 24 of the flexible conduit 20 in first, second, and third translation directions.

The housing 30 retains and supports translatable rigid hollow conduit elements 38 and 39 along an axis 37 that is substantially perpendicular to the outside wall 16 of the steam generator 14. The flexible conduit 20 passes through the interior of the rigid hollow conduit elements 38 and 39 in a direction that is collinear with the axis 37.

The rigid hollow conduit element 39 includes a terminal end 40 that includes a direction shifting curved channel 42 for guiding the direction of movement of the terminal working end 24 of the flexible conduit 20 at a substantially right angle with respect to the axis 37. The right angle movement of the terminal working end 24 of the flexible conduit 20 constitutes a second translation direction which is at right angles to the first translation direction.

A reversible motor 44 and gears 46 and 48 are provided to translate the hollow conduit elements 38 and 39 in the first translation direction, both back and forth, collinear with the axis 37. The first translation direction may be referred to as the "x" direction.

A reversible motor 50 and gears 52 and 54 are provided to translate the flexible conduit 20 in the second translation direction, both back and forth, perpendicular to the axis 37. The flexible conduit 20 is uncoiled from the magazine 21 by the motor 50 and gears 52 and 54. That is, the flexible conduit 20 is moved collinear with the axis 37 until it reaches the direction shifting curved channel 42 at which it takes a 90 degree turn. Movement of the terminal working end 24 of the flexible conduit 20 past the direction shifting curved channel 42 results in translation of the terminal working end 24 in the second translation direction. The second translation direction may be referred to as the "y" direction.

A rotatable carriage 60 is provided to carry the rigid hollow conduit elements 38 and 39. A reversible motor 56 and gear 58 are provided to rotate the carriage 60 which rotates the rigid hollow conduit elements 38 and 39 and the terminal working end 24 of the flexible conduit 20 around the axis 37. When the terminal working end 24 of the flexible conduit 20 is rotated around the axis 37, the terminal working end 24 moves along a curved path in the interior 12 of the steam generator 14, the curved path constituting a third direction of translation of the terminal working end 24. The third translation direction may be referred to as the "z" direction.

As stated above, in the embodiment of the invention shown in FIG. 1, the motors 44, 50, and 56 are for translating the terminal working end 24 of the flexible conduit 20 in the "x", "y", and "z" directions, respectively. The motors 44, 50, and 56 are all connected to a computer 62. To monitor the movement of the terminal working end 24 in the interior 12 of the steam generator 14, encoders 64, 66, and 68 are provided, and these encoders are connected to the computer 62. The encoder 64 monitors translation of the terminal end 24 in the "x" direction. The encoder 66 monitors translation of the terminal end 24 in the "y" direction. The encoder 66 monitors translation of the terminal end 24 in the "z" direction.

Under control of the computer 62, and in conjunction with the respective motors 44, 50, and 56 and the respective encoders 64, 66, and 68, the terminal working end 24 of the flexible conduit 20 can be incremented or indexed stepwise in the "x", "y", and "z" directions, respectively. This incremental indexing can be especially useful when the terminal working end 24 is moved along the "x" incrementally from one tube lane 28 to successive tube lanes. If distances of successive tube lanes 28 change in a particular steam generator, or if distances between tube lanes 28 in one steam generator are different from tube lane distances in another steam generator, the computer 62 can be programmed to accommodate the different tube lane distances.

The robot arm of the invention is easy to install. It bolts directly to the handhole flange 32 and is held rigidly in place. The housing 30 does not move during operation of the robot arm, and the stationary housing 30 establishes a base reference point for digital indexing of translation of the terminal working end 24 in the "x", "y", and "z" directions.

The flexible conduit 20 can have a beginning end 69 which is connected to one or more of the following apparatuses, represented as inspection and/or maintenance apparatuses 70, for inspecting and/or maintaining the interior 12 of the steam generator 14 from outside the steam generator 14: an optical fiber scope for viewing; an optical fiber for carrying laser light for vaporizing deposits; a nitrogen supply for blowing dirt off of the optics of the fiber scope or for drying wet surfaces; an electrolytic enhancement apparatus for etching radioactive particles off of interior surfaces; and a water hose for carrying high pressure water for cleaning. When the flexible conduit 20 carries a water hose, it is often referred to as a water lance.

If desired, the flexible conduit 20 shown in FIG. 1 can be completely retracted into the magazine 21, the beginning end 69 can be disconnected from the apparatuses 70, the existing flexible conduit 20 can be removed from the magazine 21, and a different flexible conduit can be put in the magazine 21. In this respect, a wide variety of flexible conduits in association with, or independent of, respective magazines can be employed.

As described above, two rigid hollow conduit elements 38 and 39 are employed in the embodiment shown in FIG. 1. The number of the rigid hollow conduit elements and the length of each element is determined by the distance in the "x" direction that the terminal working end 24 has to translate into the interior 12 of the steam generator 14. For example, if the terminal working end 24 is to translate into the steam generator 14 a distance greater than the distance that can be reached with two rigid hollow elements, then one or more additional rigid hollow elements similar to element 38, not having a direction shifting channel, can be added between elements 38 and 39 present in FIG. 1. More specifically, before any additional rigid hollow elements can be added, the terminal working end 24 must be retracted to a point beyond the connection between elements 38 and 39. The element 39 can be separated from element 38, and an additional element like element 38 can be added to element 38. Then, element 39 is connected to the new element, and the new element is located between elements 38 and 39. It is noted that a complementary lock and key type connection 72 is used to connect element 38 to element 39. A new rigid hollow conduit element placed between elements 38 and 39 would also have complementary lock and key type connections to the respective elements 38 and 39.

The environment inside the steam generator is generally wet, even after shut down for inspection or maintenance. Thus, when the robot arm of the invention is attached to the outer wall of the steam generator, it would be desirable if provision is made to prevent water, that is radioactive water, from leaking past the robot arm. To prevent leaking out of radioactive water, a flexible 0-ring 74 is placed between the flange 32 and a portion of an adjacent outer wall of the housing 30.

In accordance with another feature of the invention, an offset adapter plate can be provided to enable inspection and/or maintenance of the interior of a steam generator whose handhole is offset from the divider lane between arrays of steam generator tubes. An offset adapter plate can be bolted onto the flange outside the handhole. The offset adapter plate can be offset from the center of the handhole so that the robot arm of the invention has a straight line path from outside the steam generator to the divider lane in the interior of the steam generator.

In summary, numerous benefits have been described which result from employing the principles of the invention. With the invention, a robot-based system is provide that is useful for inspection and maintenance of the relatively small nuclear steam generators found in naval nuclear steam generators. Moreover, the reduced size of the components that are present in the interior of the steam generator allows the subject invention to be considered substantially universally applicable, being able to fit into a wide variety of steam generators, especially nuclear steam generators aboard naval vessels.

By employing the invention, a robot-based system is provided for inspection and maintenance of nuclear steam generators that does not subject blowdown pipes to risk of failure due to carrying the weight of the robot system. With the invention, a robot-based inspection and maintenance system for nuclear steam generators is provided in which only limited portions of the system need to be decontaminated after the inspection and maintenance operations are completed. With the invention, a robot-based inspection and maintenance system for nuclear steam generators is provided that does not place unwanted stresses and strains on the steam generator tubes inside the steam generator.

With the invention, an adapter plate whose center is offset from the center of a handhole can be fastened to the handhole to enable the robot arm of the invention to have a straight line path from outside the steam generator to an offset divider lane inside the steam generator.

Because most of the components of the robot arm of the invention are located outside the steam generator, and because there are few space limitations outside the steam generator, there are little or no space limitations on the size of the components located outside the steam generator. The components outside the steam generator can be normal size and not compromised to fit inside the steam generator.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for inspecting and maintaining the interior of a steam generator through a port in an outside wall, said port leading to a divider lane dividing arrays of steam generator tubes, wherein said arrays have straight tube lanes perpendicular to said divider lane, said apparatus comprising:

a flexible movable conduit for conveying the inspection or maintenance apparatus from outside said steam generator to and around the interior of said steam generator, said flexible movable conduit having a terminal working end which is translated to and around the interior of said steam generator through an access port;

translating and guiding means connected to the wall of said steam generator and retained substantially outside said steam generator for guiding inspection and maintenance apparatus.

wherein said translating and guiding means provides three directions of movement, in an x direction perpendicular to the outside wall of said steam generator and collinear with the axis of the access port, in a y direction substantially perpendicular to the x direction, and in a rotational z direction that sweeps around the x axis, wherein said translating and guiding means includes a rigid hollow conduit, rotatable, translatable in the x direction, and having an approximately 90 degree bend at the working end, thereby allowing translation of said flexible conduit in the x direction by positioning the rigid hollow conduit, in the y direction upon translation of said flexible conduit through said bend, and in the z direction upon rotation of the rigid hollow conduit, and wherein said guiding means includes said tube lanes.

2. The apparatus of claim 1 wherein said translating and guiding means also comprises:

a computer;

encoders connected to said computer that serve to determine the coordinates of the working end of the flexible conduit and are connected to said computer; and control motors for guiding and translating said rigid hollow conduit and said flexible conduit.

3. The apparatus of claim 2, wherein the control motors are controlled by said computer.

4. The apparatus of claim 1 wherein said translating and guiding means includes a plurality of connectable rigid hollow tube portions that can be connected together to increase translation in the x direction.

5. The apparatus of claim 1 wherein said flexible conduit means is stored in a magazine and is withdrawn from the magazine by one of said control motors.

6. The apparatus of claim 1 wherein said apparatus includes means for visual inspection.

7. The apparatus of claim 1 wherein said apparatus include means for removal of sludge deposits by water jet lancing.

* * * * *